INVENTOR.S

BY Yoshinori Okamota
Takanori Onda

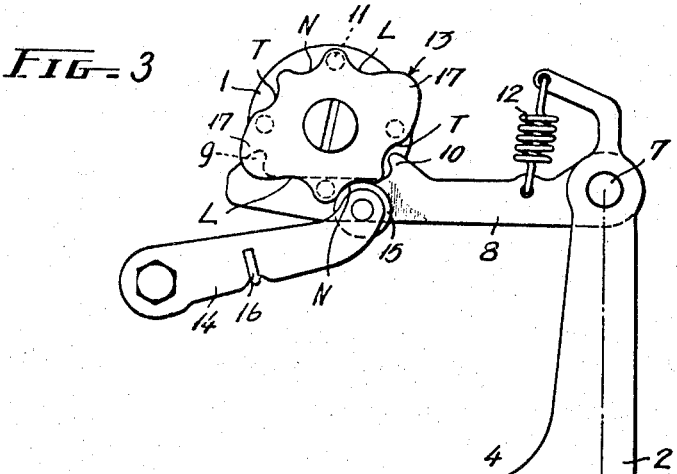
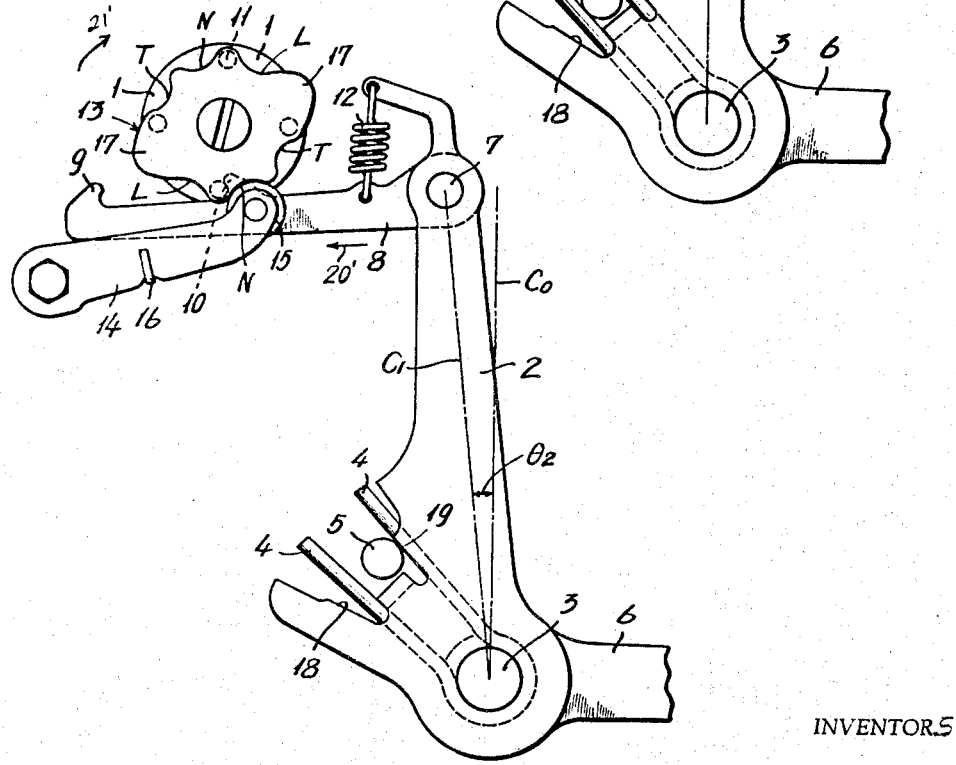

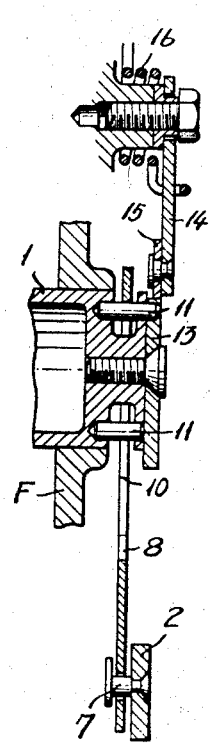
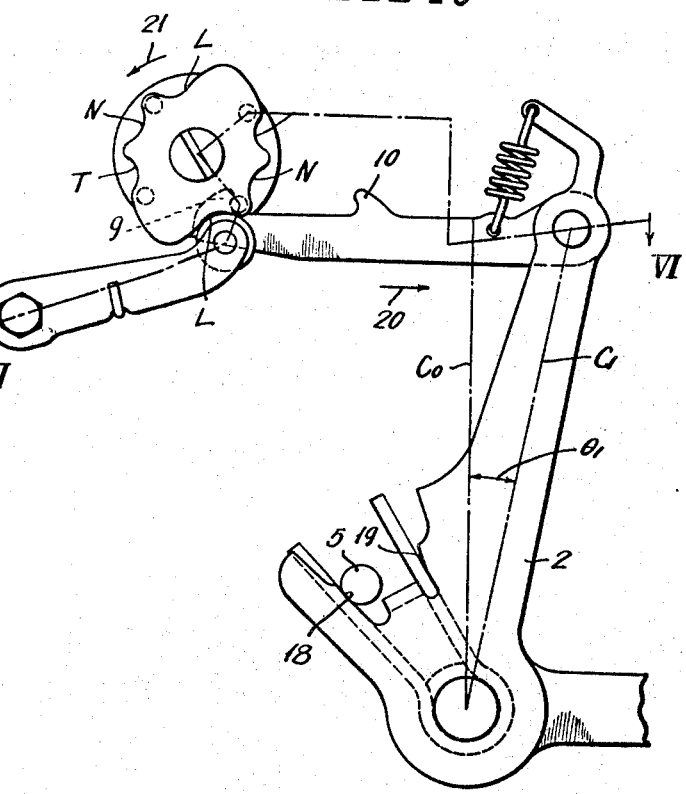
FIG=6
FIG=5

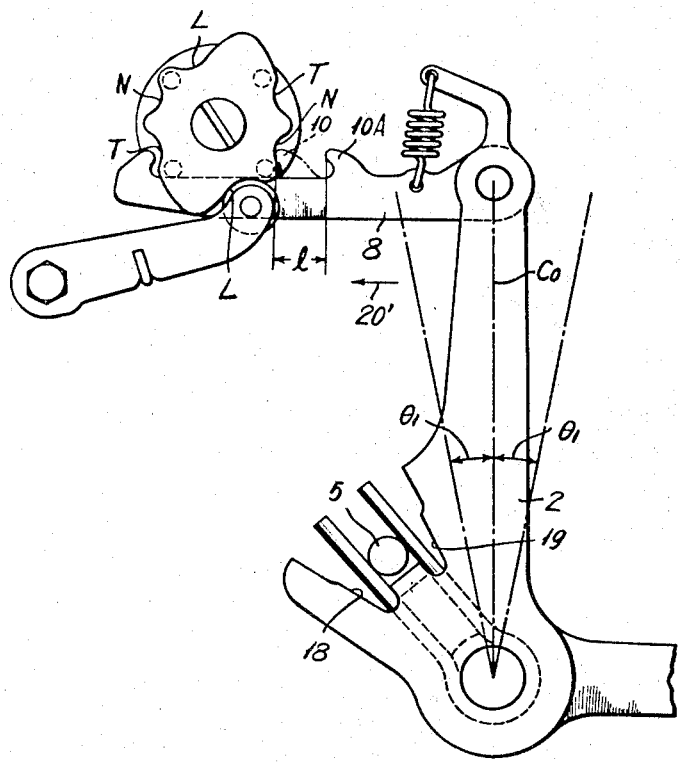

United States Patent Office 3,421,384
Patented Jan. 14, 1969

3,421,384
CHANGE SPEED APPARATUS FOR A VEHICLE
Yoshinori Okamoto and Takanori Onda, Tokyo, Japan, assignors to Kabushiki Kaisha Honda Gijutsu Kenkyusho, Shimoniikura, Oaza, Yamato-machi, Kitaadachi-gun, Saitama-ken, Japan
Filed Sept. 22, 1967, Ser. No. 669,816
Claims priority, application Japan, Sept. 22, 1966, 41/62,334
U.S. Cl. 74—474            10 Claims
Int. Cl. G05g 9/08; F16h 5/06; G05g 9/16

ABSTRACT OF THE DISCLOSURE

Change speed apparatus on which a rotatable drum operates a change speed mechanism by the actuation of a pivotal swing arm which when successively moved in a forward direction serves to intermittently rotate the drum and place the change speed mechanism alternately in first and second speed positions, whereas when the swing arm is moved in reverse direction the drum is driven in reverse by half the angular distance as in the forward direction and the change speed mechanism is placed in neutral position.

Brief summary of the invention

The present invention relates to change speed apparatus for a motorized two-wheel vehicle.

An object of the invention is to provide a simple change speed apparatus for a motorized two-wheel vehicle which is operable easily and accurately with safety even by a beginner.

The invention is characterized by the provision of a swing arm which is pivotally movable in opposite directions by operating a change speed pedal such that when the swing arm is moved in one direction, shifting is effected to a neutral position. In further accordance with the invention such shifting to the neutral position may be limited to occur only from the low speed position.

In accordance with the invention, there is provided a change speed apparatus for a vehicle which comprises a rotatable change speed drum for operating a change speed mechanism between first and second positions and a neutral position. The drum is operated by a swing arm which is mounted for limited pivotal movement in opposite directions such that as the swing arm is pivotally moved in succession in a first direction, the drum means is intermittently rotated in one direction to alternately place the change speed mechanism in the first and second speed positions, whereas when the swing arm is pivotally moved in opposite direction the drum is rotated in reverse direction half the angular distance as in the forward direction, to place the change speed mechanism in neutral position.

The change speed apparatus may further comprise means for limiting the reverse direction of rotation of the drum such that change to the neutral position is effected only from one of the speed positions.

The rotation of the drum through the particular angular distances in the forward and reverse directions may be obtained on the one hand by limiting the angle of movement of the swing arm in its reverse direction to a magnitude of about half of that in its forward direction, and on the other hand, by providing for equal magnitude of pivotal movement of the swing arm in opposite directions and employing a lost motion device between the swing arm and the drum, so that when the swing arm is moved in reverse direction, half its motion is ineffective.

Brief description of the drawing

FIGURES 1 to 3 are diagrammatic side views of the apparatus of the present invention in a high speed position, a low speed position and a neutral position respectively;

FIGURE 4 is a side view showing the condition where the apparatus has completed its movement to the neutral position;

FIGURE 5 is a side view showing the condition where the apparatus has completed its movement to the low speed positions;

FIGURE 6 is a sectional view taken along line VI—VI in FIG. 5; and

FIGURE 7 is a side view of another embodiment of the apparatus of the invention.

Detailed description

Figure 1:
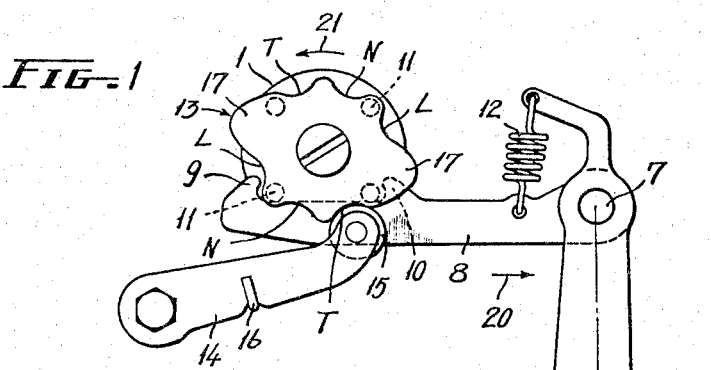

The invention will next be explained in detail with reference to the accompanying drawing:

A change speed drum 1 is rotatably supported in a vehicle body F (FIG. 6), for operating a change speed mechanism for a motorized two-wheel vehicle. Numeral 2 denotes a swing arm fixed at its rear end to a pedal shaft 3, and a center line $C_1$ of the arm is normally in coincidence with a standard stop line $C_0$ by the engaging of arms 4 of a holding spring with a stationary pin 5 therebetween. The arm 2 and thereby the center line $C_1$ may be swung to the right and the left of the standard stop line $C_0$ by pushing a pedal (not shown) of a change speed pedal arm 6 connected to the pedal shaft 3 up or down. The free end of the swing arm 2 is pivotally connected by shaft 7 to the rear end portion of a change speed arm 8. Arm 8 carries two operation claws 9 and 10 arranged to face one another on one side surface of the arm 8. Several engaging pins 11 are arranged annularly at regular intervals on one side surface of the change speed drum 1, and any two of them are loosely inserted between the operation claws 9 and 10. Numeral 12 is a tension spring for urging the top end portion of the change speed arm 8 toward the change speed drum 1, and numeral 13 is a cam plate fixed to the change speed drum 1. Numeral 14 is a swingable stopper having at its top end a roller 15 engageable in a concavity of the cam plate 13. The stopper is urged resiliently by a spring 16 (FIG. 6) toward the cam plate 13.

At the periphery of the cam plate 13 there are formed two sets of concavities, each set being composed of a concavity L for a first speed (low speed), a concavity T for a second speed (high speed) and a concavity N for a neutral position between concavities L and T. Additionally, between the sets of concavities are large projection portions 17, the function of which will be described in detail hereinafter. The swing arm 2 is provided with stopper surfaces 18 and 19 which are respectively brought into abutment with the stationary pin 5 when the arm 2 is pivoted in one or the other direction. The space between the stopper surface 19 and the pin 5 is designed to be about half the space between the stopper surface 18 and the pin 5 at the normal position in which the center line $C_1$ of the swing arm 2 is in coincidence with the standard stop line $C_0$.

The operation of the apparatus is as follows:

If, by operating the pedal, the stopper surface 18 is repeatedly brought into abutment with the pin 5 to swing the swing arm 2 repeatedly in the direction 20 through angles equal to $\theta_1$ (FIG. 5), the operation claw 9 engages successive engaging pins 11 to intermittently rotate the change speed drum 1 in the direction 21, whereby the first speed concavity L and the second speed concavity T are brought successively in engagement with the roller 15, whereby the drum 1 assumes the first speed position and the second speed position in alternation. In this case the roller 15 passes the neutral concavity N when going from concavity T to concavity L, whereas the roller passes projecting portion 17 when going from concavity L to concavity T. More specifically, when the swing arm 2 is turned through angle $\theta_1$, the drum and cam are turned through a corresponding distance so that roller 15 passes between concavities L and T. Thus, considering FIG. 1 it is seen that roller 15 is engaged in concavity T. When the arm 2 is swung through an angle $\theta_1$, cam 13 is turned, as shown in FIG. 5, so that roller 15 next engages concavity L. When the arm 2 is released, the mechanism is in the position shown in FIG. 2.

Figure 2:
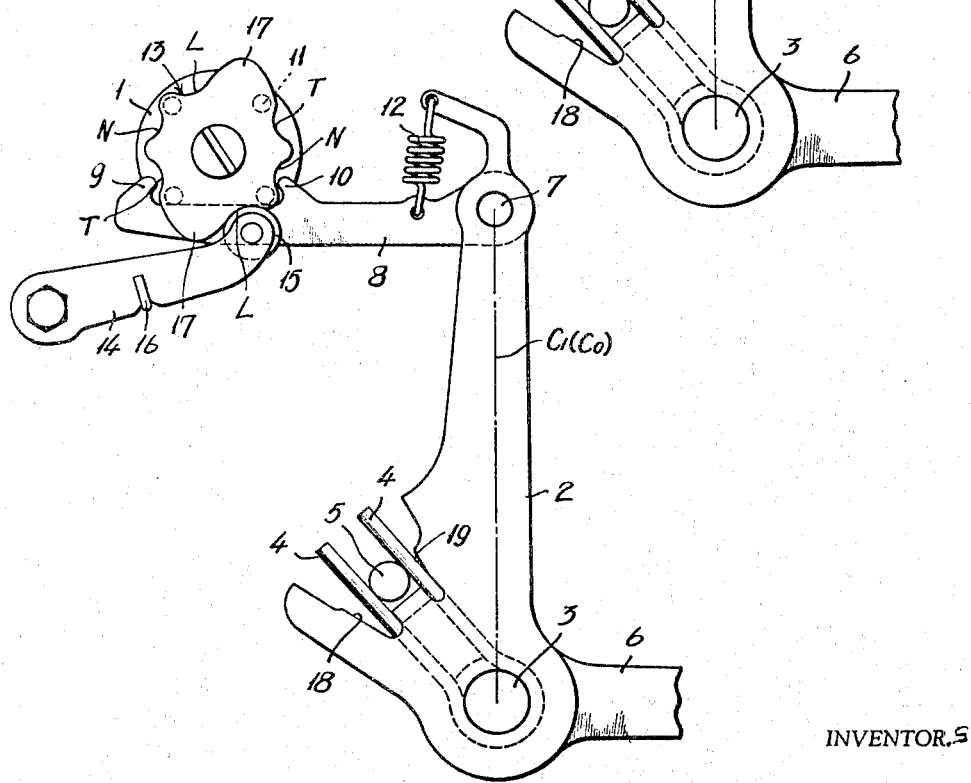

If the roller 15 is in engagement with the first speed (low speed) concavity L, as shown in FIG. 2, and the pedal is operated to move the stopper surface 19 into abutment with the pin 5 by swinging the arm 2 in the reverse direction 20' through an angle $\theta_2$ as shown in FIG. 4, the operation claw 10 operates to push an engaging pin 11 to rotate the change speed drum 1 in the reverse direction 21', but the magnitude of rotation is half of that in the above-mentioned change speed operation. Since the neutral concavity N is arranged behind concavity L in the reverse direction 21', the roller leaves the first speed concavity L to come in engagement with the neutral concavity N as shown in FIG. 4, and the change speed drum 1 stops at the neutral position as shown in FIG. 3. If, however, from the position where the roller 15 is in engagement with the second speed (high speed) concavity T, as shown in FIG. 1, the arm 2 is swung in the reverse direction through angle $\theta_2$, the roller 15 does not pass over the rising portion 17 but only rides on the slant surface thereof. Accordingly, as the pedal is then released, the cam plate 13 and the change speed drum 1 are pushed by the roller 15 to rotate in the regular direction 21 and the roller 15 is brought back into engagement with the original second speed concavity T, so that direct transfer from the high speed to neutral is not permitted. Accordingly, in order to return to neutral position, shifting must be made to low speed in the regular direction 21, after which the roller 15 can be brought into a neutral concavity by turning arm 2 in the reverse direction. The apparatus can be modified, however, such that the rising portion 17 is eliminated and replaced by and additional neutral concavity at its site. This modification makes it possible to directly shift from the high speed position to the neutral position by rotating the swing arm 2 in the reverse direction by $\theta_2$.

In the apparatus as described above, the speed changes are limited to two stages of a first speed and a second speed, and only if the pedal is repeatedly operated in the regular direction can these high and low speeds be alternately obtained, whereas if the pedal is operated in the reverse direction, the change speed drum can be moved to obtain the neutral position without the necessity of paying attention to the pushing extent of the pedal. Accordingly, the apparatus can be operated easily and accurately with safety even by a beginner. Additionally, in the apparatus the rotating amount of the swing arm in the reverse direction is designed to be a half of the amount thereof in the regular direction in order to permit stopping of the change speed drum accurately at the neutral position, so that the mechanism can become very simple and durable.

FIG. 7 shows a simple mechanism wherein the rotating amounts of the swing arm 2 in the reverse and regular direction are both equal to $\theta_1$ and yet the change speed drum 1 can be stopped surely at the neutral position.

In this figure, the space between the stopper surface 19 for the reverse direction rotation of the spring arm 2 and the pin 5 is equal to the space between the regular direction stopper surface 18 and the pin 5. The operation claw 10 is omitted and replaced by a claw 10a which is displaced to a position away from the engaging pin 11 by about a half of the stroke, that is, the distance of movement thereof by the rotation $\theta_1$ of the swing arm 2. Accordingly the distance $l$ represents a lost motion gap through which the operation claw 10a moves relative to the engaging pin 11 without acting thereon so that when the swing arm 2 is rotated by $\theta_1$ in the reverse direction, the change speed drum 1 is stopped at the neutral position by the latter half stroke of the claw 10a, with the rotating amount thereof being decreased as if the swing arm 2 were rotated by $\theta_2$. According to this mechanism, by merely changing the position of one of the operation claws, the swing arm 2 is allowed to be rotated equally in both directions similar to the conventional case, whereby the construction and operation of the apparatus is simplified.

What is claimed is:
1. Change speed apparatus for a vehicle comprising rotatable change speed drum means for operating a change speed mechanism between first and second speed positions and a neutral position, and means for operating the drum means including a swing arm mounted for limited pivotal movement in opposite directions, and means coupling the swing arm and the drum means for intermittently rotating the drum means in one direction to alternately place the change speed mechanism in the first and second speed positions as the swing arm is pivotally moved in succession in a first direction, and for rotating the drum means in reverse direction half the angular distance as in said one direction to place the change speed mechanism in neutral position as the swing arm is pivotably moved in opposite direction.

2. Apparatus as claimed in claim 1 comprising means for limiting the reverse direction of rotation of the drum means such that change to the neutral position is effected only from one of said speed positions.

3. Apparatus as claimed in claim 1, wherein said swing arm has a normal position of rest, the apparatus further comprising means engageable with said swing arm to limit pivotal movement thereof from the normal position through a given angle in said first direction and through half said given angle in the opposite direction.

4. Apparatus as claimed in claim 1, wherein said drum means comprises a cam plate having concavities corresponding to the first and second speed positions and concavities corresponding to the neutral position between the first and second speed concavities, and a roller resiliently urged into engagement in the concavities, the concavities being spaced on the cam plate such that as said swing arm is successively moved in said first direction, the cam plate is intermittently rotated in said one direction through angular distances so that the roller is engaged in successive first and second speed concavities, whereas when the arm is moved in the opposite direction, the cam plate is rotated in reverse direction through half the angular distance so that the roller is disengaged from one of the speed concavities and engaged in a neutral speed concavity.

5. Apparatus as claimed in claim 4, wherein said means coupling the swing arm and the drum means comprises an arm connected to said swing arm for movement therewith including a pair of facing claws, said drum means including a plurality of pins individually engageable by said claws whereby the drum means is rotated by movement of said arm.

6. Apparatus as claimed in claim 5, wherein one of said claws acts on a pin to rotate the drum means in said one direction as the arm is moved by the swing arm in a first direction, the other of the claws acting on a pin to rotate the drum means in reverse direction as the arm is moved by the swing arm in opposite direction.

7. Apparatus as claimed in claim 6, wherein the limited pivotal movement of the swing arm is equal in opposite directions, said other of the claws being spaced from a pin when the roller is in one of the speed concavities, such that movement of the arm caused by rotation of the swing arm in said opposite direction will take up about half its stroke before contact with a pin after which the drum means is rotated through an angular distance equal to about half that in the forward direction.

8. Apparatus as claimed in claim 4, wherein said cam plate includes projections between the first and second speed concavities for preventing movement of the roller from the second to the first speed concavities as the cam plate is moved in said reverse direction.

9. Apparatus as claimed in claim 8, wherein the concavities and projections are successively arranged on the cam plate in the following order as measured in said one direction: first speed concavity, projection, second speed concavity and neutral speed concavity.

10. Apparatus as claimed in claim 3, wherein said means for limiting pivotal movement of the swing arm comprises a stationary pin, said arm having abutment surfaces disposed on opposite sides of the pin and spaced therefrom for contacting the pin as the arm is moved in respective of said directions, the surface which contacts the pin as the arm is moved in said first direction being spaced from the pin a distance twice that of the other surface with the arm in said normal position of rest.

References Cited

FOREIGN PATENTS

| | | |
|---|---|---|
| 331,122 | 10/1935 | Italy. |
| 486,144 | 5/1938 | Great Britain. |
| 569,742 | 6/1945 | Great Britain. |

MILTON KAUFMAN, *Primary Examiner.*

U.S. Cl. X.R.

074—337.5